Aug. 12, 1952   M. R. HICKS   2,606,370
INSIDE MICROMETER
Filed Aug. 11, 1947
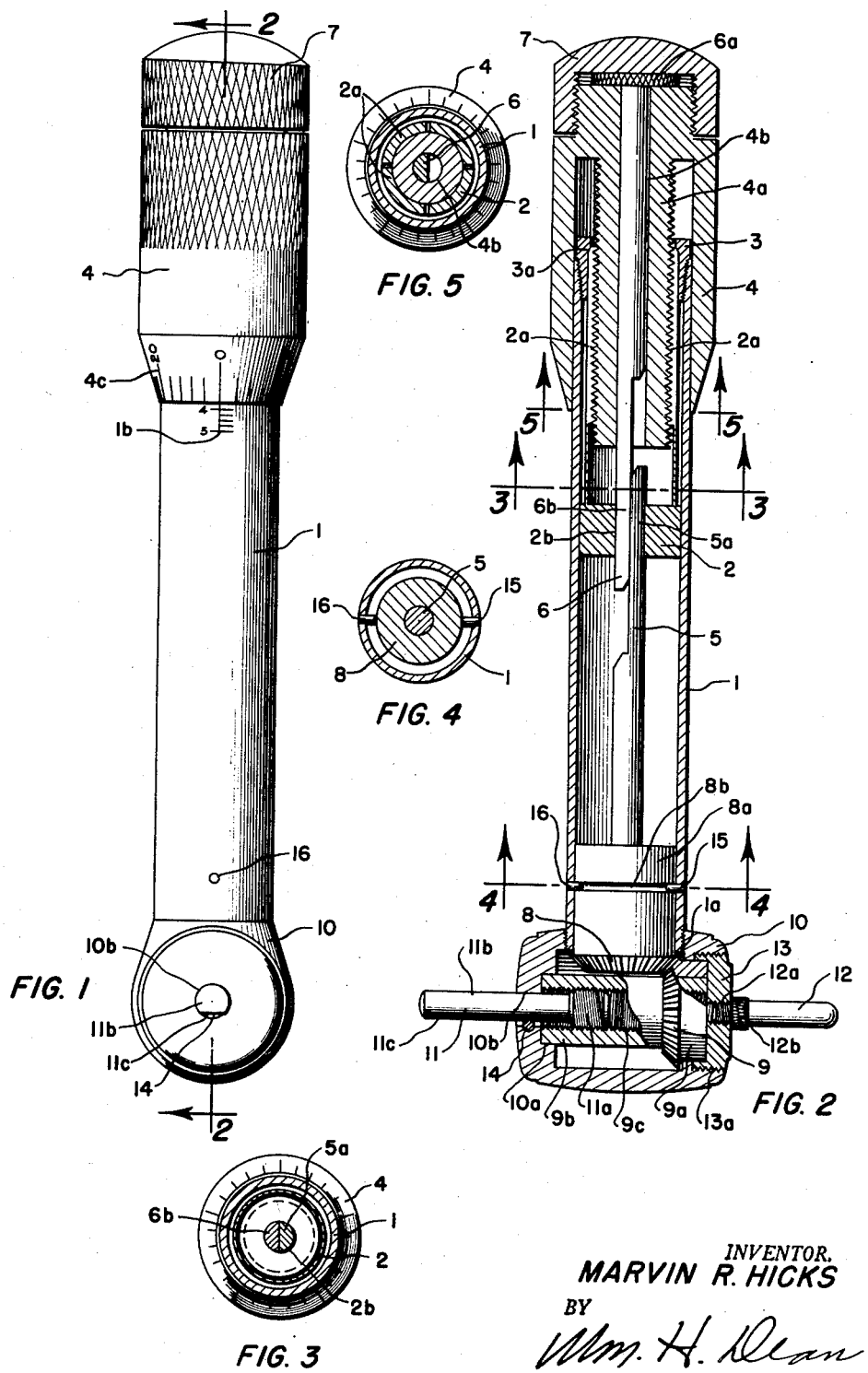
INVENTOR.
MARVIN R. HICKS
BY
Wm. H. Dean
AGENT Patented Aug. 12, 1952

2,606,370

UNITED STATES PATENT OFFICE 2,606,370

INSIDE MICROMETER

Marvin R. Hicks, San Diego, Calif.

Application August 11, 1947, Serial No. 767,889

6 Claims. (Cl. 33—164)

My invention relates to a precision measuring instrument, more particularly to an inside micrometer for measuring internal dimensions of various machinery or the like, and the objects of my invention are:

First, to provide an inside micrometer of this class which may be employed to measure in thousandths of an inch in various increments from one to several inches as desired;

Second, to provide an inside micrometer of this class which may be employed to measure a minimum of one inch and which may be readily employed to measure a distance of several inches to the precise degree of thousandths of an inch;

Third, to provide an inside micrometer of this class having a barrel scale providing the entire reading for the micrometer in substantially the same manner as conventional outside micrometers;

Fourth, to provide an inside micrometer of this class in which the feelers thereof are extended at right angles to the axis of the handle whereby the handle may be of any length desired for extending said feelers into holes of various depths inaccessible to conventional micrometers;

Fifth, to provide inside micrometers of this class having feelers at the extending end thereof, one of which is operated by a shaft rotating at right angles thereto, said shaft being slidably engaged by a secondary shaft connected to a conventional micrometer barrel whereby lead and rotation of said barrel is normal while said first shaft is rotatably and slidably driven;

Sixth, to provide an inside micrometer of this class having novel and easily accessible resetting means whereby the micrometer scale may be reset to zero as desired;

Seventh, to provide an inside micrometer of this class which is very precise and accurate; and Eighth, to provide an inside micrometer of this class which is very simple and economical of construction, efficient in operation and which will not readily deteriorate or get out of order.

With these and other objects in view, as will appear hereinafter, my invention consists of certain novel features of construction, combination and arrangement of parts and portions as will be hereinafter described in detail and particularly set forth in the appended claims, reference being had to the accompanying drawing and to the characters of reference thereon forming a part of this application in which:

Fig. 1 is a side elevational view of my inside micrometer, Fig. 2 is a longitudinal sectional view thereof taken from the line 2—2 of Fig. 1 showing parts and portions in elevation to facilitate the illustration, Fig. 3 is a transverse sectional view taken from the line 3—3 of Fig. 2, Fig. 4 is a transverse sectional view taken from the line 4—4 of Fig. 2, and Fig. 5 is a transverse sectional view taken from the line 5—5 of Fig. 2.

Similar characters of reference refer to similar parts and portions throughout the several views of the drawing.

The tube 1, nut 2, nut adjuster 3, barrel 4, drive shafts 5 and 6, cap 7, gears 8 and 9, feeler casing 10, feelers 11 and 12, casing cap 13, and the pins 14, 15 and 16 constitute the principal parts and portions of my inside micrometer.

The tube 1 is a hollow cylindrical member having external screw threads 1a on which the feeler casing 10 is secured. The nut 2 is fixed internally of the tube 1 intermediate its end and this nut 2 is provided with internally screw threaded finger portions 2a which engage the externally screw threaded portion 4a of the barrel 4, all as shown best in Fig. 2 of the drawing. This screw threaded portion 4a of the barrel 4 is provided with a central bore 4b therein in which the drive shaft 6 is positioned. This drive shaft 6 is provided with an enlarged head portion 6a abutted to the outer end of the barrel 4 and is engaged in opposed relation to the outer end of said barrel 4 by cap 7 which is screw threaded externally of the barrel 4 for clamping said head 6a of the drive shaft 6 in frictionally locked position. Surrounding the fingers 2a and connected in internally screw threaded relationship with the tube 1 is the nut adjuster 3. This nut adjuster 3 is ring shaped and provided with an inwardly directed annular ramp 3a adapted to squeeze the fingers 2a inwardly when adjusted longitudinally of the tube 1 toward the feeler casing 10. The nut 2 in axial alignment with the bore 4b of the barrel 4 is provided with a bore portion 2b in which the slidably associated ends 5a and 6b respectively of the drive shafts 5 and 6 are positioned. These slidably engaged end portions 5a and 6a of the drive shafts 5 and 6 are semicircular in cross section and arranged in overlapped relationship within the bore portion 2b of the nut 2. Thus, the drive shafts 5 and 6 may rotate in the bore 2b of the nut 2 and the end portion 6b of the drive shaft 6 may slide through bore 2b relatively to the end portion 5a of the drive shaft 5. Connected to the lower end of the drive shaft 5 is the gear 8 having a hub portion 8a provided with an annular groove 8b in which the pins 15 and 16 are engaged at opposite sides of the tube 1 through the wall of which said pins 15 and 16 extend. The bevel gear 8 extends slightly beyond the end 1a of the tube 1 and meshes with the gear 9 having a bearing hub 9a revolubly mounted in the casing cap 13, as shown best in Fig. 2 of the drawings. This gear 9 at its opposite end is provided with a shank portion 9b revolubly mounted in a recess bearing portion 10a in the feeler casing 10. The shank portion 9b is hollow and provided with internal screw threads 9c in which the screw threaded head 11a of the feeler 11 is engaged. This feeler 11 is provided with a reduced partially circular in cross section shank portion 11b extending through the bore 10b in the feeler casing 10. This feeler 11 is provided with a longitudinally disposed flat portion 11c engaged by the pin 14 extending transversely through the bore 10b chordally thereof, as shown best in Figs. 1 and 2 of the drawing. This pin 14 prevents rotation of the feeler 11 during rotation of the gear 9 about the head 11a of the feeler 11 which is maintained in screw threaded relationship with the internally screw threaded portion 9c in the shank 9b of said gear 9. The casing cap 13 is provided with external screw threads 13a engaging internal screw threads in the feeler casing 10 as shown best in Fig. 2. The inner end of the cap 13 provides an end play bearing for the gear 9 maintaining precise meshed relationship of the gears 8 and 9. The feeler 12 is provided with an externally screw threaded portion 12a screw threaded in the feeler casing cap 13 in axial alignment with the feeler 11. This feeler 12 is provided with a shoulder 12b engaging the outer side of the cap 13 for precise location relatively thereto. It will be here noted that the feeler 12 may be made in any length desired in increments of one inch or one-half inch as desired, so that any dimension may be taken in thousandths of an inch where the feeler 12 is used in cooperative relationship with the feeler 11 which is extendable throughout the distance of one-half inch. This one-half inch extension of the feeler 11 is directly readable on the longitudinal scale 1b on the tube 1 cooperating with the annular scale 4c on the skirt of the barrel 4, as shown best in Fig. 1 of the drawing.

The operation of my inside micrometer is substantially as follows:

In order to zero the extension of the feeler 11 so that it is precisely set the cap 7 is removed from the end of the barrel 4 and the scales 1b and 4c are arranged in zero position. Then the knurled head 6a of the drive shaft 6 is turned until the feeler 11 is retracted to its zero position which may be checked by conventional outside micrometer. When the feelers 11 and 12 indicate a zero setting the cap 7 is replaced in connection with the barrel 4 and tightly engaged with the head 6a of the drive shaft 6, fixing the same in frictional engagement with the barrel 4. The feeler 11 may then be extended by turning the barrel 4 which advances longitudinally of the tube 2 by means of the threads on the externally screw threaded portion 4a engaging the fingers 2a of the nut 2. The shaft 6 extends itself longitudinally through the bore 2b of the nut 2 and slides adjacent the end portion 5a of the shaft 5. Referring to Fig. 3 it will be seen that the semicircular in cross section shape of the ends 5a and 6a of the drive shaft 5 and 6 permit such sliding movement and maintain revoluble fixed relationship of the shafts 5 and 6. Thus, rotation of the barrel 4 transfers motion to the gear 8 through the shaft 5 and 6 which gear 8 meshes with the gear 9 and turns the same. Screw threaded relationship of the internally screw threaded bore 9c of the gear 9 with the externally screw threaded nut 11a of the feeler 11 causes extension of the feeler 11 from the feeler casing 10. This is aided by the prevention of rotation of the feeler 11 by the pin 14 extending chordally through the bore 10b in the end of the casing 10 through which said feeler 11 extends. The flat 11c of the feeler 11 slides over the pin 14 and engages the same for preventing rotation. When measuring a bore in a mechanical structure, the feeler casing 10 of the inside micrometer is inserted therein and the feeler 11 is extended causing engagement of the feeler 12 with the opposite side of the internal bore, the reading may be taken on the scales 1b and 4c indicating precisely in thousandths of an inch the internal diameter of the bore. It will be here noted that the feeler 12 may be of very short length whereby the overall distance between ends of the feeler 11 and 12 may be slightly less than one inch. With proper extension of the feeler 12, distances up to several inches may be measured in thousandths of an inch, provided the feeler 12 is precisely finished to a given length.

When it is desired to adjust the screw threaded relationship of the externally screw threaded portion 4a of the barrel 4 relatively to the fingers 2a of the nut 2, the adjuster 3 may be rotated whereupon the ramp 3a thereof exerts inwardly directed force on the fingers 2a for closely engaging the same with the externally threaded portion 4a of the barrel 4.

Though I have shown and described a particular construction, combination and arrangement of parts and portions, I do not wish to be limited to this particular construction, combination and arrangement, but desire to include in the scope of my invention, the construction, combination and arrangement substantially as set forth in the appended claims.

Having thus described my invention, what I claim as new and desire to secure by Letters Patent is:

1. In an inside micrometer, the combination of a feeler casing, a feeler member in fixed relationship with said feeler casing, a bevel gear axially aligned with said feeler member positioned in said casing and rotatable therein, a second feeler in screw threaded relationship with said gear extendable from the opposite end of said casing from said feeler member, a second gear meshed with said first mentioned gear having its axis substantially 90° therefrom, a shaft connected with said second mentioned gear having a semicircular in cross section portion provided with a flat surface, a second shaft having a semicircular in cross section portion provided with a flat surface engageable with the flat surface of the semi-circular in cross section portion of said first mentioned shaft and longitudinally slidable relatively thereto, a tube connected with said feeler casing surrounding said shafts, a screw-threaded nut fixed in said tube, a barrel in screw threaded relationship with said nut and connected to said second shaft.

2. In an inside micrometer, the combination of a feeler casing, a feeler member in fixed relationship with said feeler casing, a bevel gear axially aligned with said feeler member positioned in said casing and rotatable therein, a second feeler in screw threaded relationship with said gear extendable from the opposite end of said casing from said feeler member, a second gear meshed with said first mentioned gear having its axis substantially 90° therefrom, a shaft connected with said second mentioned gear having a semicircular in cross section portion provided with a flat surface, a second shaft having a semicircular in cross section portion provided with a flat surface engageable with the flat surface of the semi-circular in cross section portion of said first mentioned shaft and longitudinally slidable relatively thereto, a tube connected with said feeler casing surrounding said shafts, a screw-threaded nut fixed in said tube, a barrel in screw threaded relationship with said nut and connected to said second shaft, said second shaft having a head portion at the end of said barrel and extending therethrough and a cap screw threaded on said barrel for fixing the head of said second shaft against rotation relatively to said barrel.

3. In an inside micrometer of the class described, the combination of a tube, a feeler casing at the lower end of said tube having a fixed feeler member in connection therewith, an internally screw-threaded bevel gear rotatably mounted in said casing having a feeler screw threaded therein, a second bevel gear in mesh with said first mentioned bevel gear, a shaft connected with said second mentioned bevel gear and having a flat portion, said tube surrounding said shaft, and fixed to said feeler casing, a micrometer barrel longitudinally screw threadably adjustable in said tube, a second shaft connected with said barrel and having a flat portion longitudinally slidably engaged with the flat portion of said first mentioned shaft and rotatably abutted thereto whereby positive rotation of said first mentioned shaft is accomplished by engagement with said second mentioned shaft.

4. In an inside micrometer of the class described, the combination of a tube, a feeler casing at the lower end of said tube having a fixed feeler member in connection therewith, an internally screw-threaded bevel gear rotatably mounted in said casing having a feeler screw threaded therein, a second bevel gear in mesh with said first mentioned bevel gear, a shaft connected with said second mentioned bevel gear and having a flat portion, said tube surrounding said shaft fixed to said feeler casing, a micrometer barrel longitudinally screw threadably adjustable in said tube, a second shaft connected with said barrel and having a flat portion longitudinally slidably engaged with the flat portion of said first mentioned shaft and rotatably abutted thereto whereby positive rotation of said first mentioned shaft is accomplished by engagement with said second mentioned shaft, said second mentioned shaft adjustably fixed in connection with said barrel.

5. In an inside micrometer, of the class described, the combination of a tube, a feeler casing at the lower end of said tube having a fixed feeler member in connection therewith, an internally screw-threaded bevel gear rotatably mounted in said casing having a feeler screw threaded therein, a second bevel gear in mesh with said first mentioned bevel gear, a shaft connected with said second mentioned bevel gear and having a flat portion, said tube surrounding said shaft and fixed to said feeler casing, a micrometer barrel longitudinally screw threadably adjustable in said tube, a second shaft connected with said barrel and having a flat portion longitudinally slidably engaged with the flat portion of said first mentioned shaft and rotatably abutted thereto whereby positive rotation of said first mentioned shaft is accomplished by engagement with said second mentioned shaft, said second mentioned shaft adjustably fixed in connection with said barrel, a nut in said tube having internally screw threaded finger portions, said barrel having a hollow externally screw threaded portion engageable with said fingers and also provided with a skirt portion surrounding said tube.

6. In an inside micrometer, of the class described, the combination of a tube, a feeler casing at the lower end of said tube having a fixed feeler member in connection therewith, an internally screw-threaded bevel gear rotatably mounted in said casing having a feeler screw threaded therein, a second bevel gear in mesh with said first mentioned bevel gear, a shaft connected with said second mentioned bevel gear and having a flat portion, said tube surrounding said shaft and fixed to said feeler casing, a micrometer barrel longitudinally screw threadably adjustable in said tube, a second shaft connected with said barrel and having a flat portion longitudinally slidably engaged with the flat portion of said first mentioned shaft and rotatably abutted thereto whereby positive rotation of said first mentioned shaft is accomplished by engagement with said second mentioned shaft, said second mentioned shaft adjustably fixed in connection with said barrel, a nut in said tube having internally screw threaded finger portions, said barrel having a hollow externally screw threaded portion engageable with said fingers and also provided with a skirt portion surrounding said tube having a graduated scale portion, said tube having cooperative scale portion on the outer side thereof, whereby rotation of said shafts and said barrel extends said feelers and advances said barrel on said tube whereby readings in thousands of an inch may be taken directly at the skirt of said barrel on the outer side of said tube.

MARVIN R. HICKS.

REFERENCES CITED

The following references are of record in the file of this patent:

UNITED STATES PATENTS

| Number | Name | Date |
|---|---|---|
| 164,440 | Furman | June 15, 1875 |
| 842,263 | Spalding | Jan. 29, 1907 |
| 846,079 | Yost | Mar. 5, 1907 |
| 896,590 | Seidelman | Aug. 18, 1908 |
| 1,320,582 | Sperling | Nov. 4, 1919 |
| 1,463,673 | Clase | July 31, 1923 |
| 2,134,516 | James | Oct. 25, 1938 |
| 2,345,591 | Frederick | Apr. 4, 1944 |